US007426452B2

(12) United States Patent
Zielinski et al.

(10) Patent No.: US 7,426,452 B2
(45) Date of Patent: *Sep. 16, 2008

(54) DUAL PROTOCOL HANDHELD FIELD MAINTENANCE TOOL WITH RADIO-FREQUENCY COMMUNICATION

(75) Inventors: Martin Zielinski, Chanhassen, MN (US); Alan R. Dewey, Plymouth, MN (US); Alden C. Russell, II, Minnetonka, MN (US)

(73) Assignee: Fisher-Rosemount Systems. Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/269,866

(22) Filed: Nov. 8, 2005

(65) Prior Publication Data

US 2006/0161393 A1 Jul. 20, 2006

Related U.S. Application Data

(60) Continuation-in-part of application No. 11/007,876, filed on Dec. 9, 2004, now Pat. No. 7,117,122, which is a division of application No. 10/310,703, filed on Dec. 5, 2002, now Pat. No. 6,889,166.

(60) Provisional application No. 60/626,405, filed on Nov. 9, 2004, provisional application No. 60/338,477, filed on Dec. 6, 2001.

(51) Int. Cl.
*G06F 11/30* (2006.01)
(52) U.S. Cl. ..................................... 702/184
(58) Field of Classification Search ................. 702/184
See application file for complete search history.

(56) References Cited

U.S. PATENT DOCUMENTS

| 3,774,693 A | 11/1973 | Orthman |
| 1,387,619 A | 3/1975 | Kohl |
| 3,955,132 A | 5/1976 | Greenwood |
| 4,290,647 A | 9/1981 | Hensel et al. |
| 4,337,516 A | 6/1982 | Murphy et al. .............. 364/551 |
| 4,535,636 A | 8/1985 | Blackburn et al. |
| 4,630,265 A | 12/1986 | Sexton ........................ 370/86 |
| 4,630,483 A | 12/1986 | Engdahl |

(Continued)

FOREIGN PATENT DOCUMENTS

DE 29917651 12/2000

(Continued)

OTHER PUBLICATIONS

International Search Report and Written Opinion from Application No. PCT/US2005/040914, filed Nov. 9, 2005.

(Continued)

*Primary Examiner*—John E Barlow, Jr.
*Assistant Examiner*—Cindy H Khuu
(74) *Attorney, Agent, or Firm*—Christopher R. Christenson; Westman, Champlin & Kelly, P.A.

(57) ABSTRACT

A dual-protocol handheld field maintenance tool is provided with radio frequency communication. The radio frequency commination can be provided by virtue of an SDIO card inserted within an SDIO slot in the handheld field maintenance tool. A method of interacting with a process using a dual-protocol handheld field maintenance tool is also provided.

7 Claims, 8 Drawing Sheets

U.S. PATENT DOCUMENTS

| | | | |
|---|---|---|---|
| 4,635,214 A | 1/1987 | Kasai et al. ............... 364/551 |
| 4,707,796 A | 11/1987 | Calabro et al. ............. 364/552 |
| 4,749,934 A | 6/1988 | Alexander et al. |
| 4,825,392 A | 4/1989 | Freeman |
| 4,954,923 A | 9/1990 | Hoeflich et al. ............... 361/11 |
| 4,964,125 A | 10/1990 | Kim ...................... 371/15.1 |
| 4,988,990 A | 1/1991 | Warrior .................... 340/25.5 |
| 5,005,142 A | 4/1991 | Lipchak et al. ............. 364/550 |
| 5,099,539 A | 3/1992 | Forester |
| 5,103,409 A | 4/1992 | Shimizu et al. ............. 364/556 |
| 5,113,303 A | 5/1992 | Herres ........................ 361/45 |
| 5,148,378 A | 9/1992 | Shibayama et al. .... 364/571.07 |
| 5,150,289 A | 9/1992 | Badavas .................. 364/154 |
| 5,197,328 A | 3/1993 | Fitzgerald .................... 73/168 |
| 5,412,312 A | 5/1995 | Crass et al. |
| 5,426,774 A | 6/1995 | Banerjee et al. |
| 5,434,774 A | 7/1995 | Seberger ................... 364/172 |
| 5,442,639 A | 8/1995 | Crowder et al. ............ 371/20.1 |
| 5,469,156 A | 11/1995 | Kogure ................. 340/870.38 |
| 5,471,698 A | 12/1995 | Francis et al. ............... 15/144.1 |
| 5,481,200 A | 1/1996 | Voegele et al. ............. 324/718 |
| 5,501,107 A | 3/1996 | Snyder et al. |
| 5,570,300 A | 10/1996 | Henry et al. .......... 364/551.01 |
| 5,573,032 A | 11/1996 | Lenz et al. ................. 137/486 |
| 5,581,033 A | 12/1996 | Hess |
| 5,598,521 A | 1/1997 | Kilgore et al. .............. 395/326 |
| 5,623,605 A | 4/1997 | Keshav et al. ........... 395/200.17 |
| 5,665,899 A | 9/1997 | Willcox ...................... 73/1.63 |
| 5,697,453 A | 12/1997 | Van Den Bosch |
| 5,742,845 A | 4/1998 | Wagner ..................... 395/831 |
| 5,752,249 A | 5/1998 | Macon, Jr. et al. |
| 5,764,891 A | 6/1998 | Warrior ................... 395/200.2 |
| 5,793,963 A | 8/1998 | Tapperson et al. ..... 395/200.31 |
| 5,828,567 A | 10/1998 | Eryurek et al. ............. 364/184 |
| 5,838,187 A | 11/1998 | Embree ..................... 327/512 |
| 5,903,455 A | 5/1999 | Sharpe, Jr. et al. ............. 700/83 |
| 5,909,368 A | 6/1999 | Nixon et al. |
| 5,923,557 A | 7/1999 | Eidson .................. 364/471.03 |
| 5,940,290 A | 8/1999 | Dixon ........................ 364/138 |
| 5,956,663 A | 9/1999 | Eryurek ..................... 702/183 |
| 5,960,214 A | 9/1999 | Sharpe, Jr. et al. .......... 395/835 |
| 5,970,430 A | 10/1999 | Burns et al. ................. 702/122 |
| 5,980,078 A | 11/1999 | Krivoshein et al. .......... 364/131 |
| 5,995,916 A | 11/1999 | Nixon et al. |
| 6,017,143 A | 1/2000 | Eryurek et al. ......... 364/148.06 |
| 6,023,399 A | 2/2000 | Kogure ........................ 364/23 |
| 6,026,352 A | 2/2000 | Burns et al. ................. 702/182 |
| 6,037,778 A | 3/2000 | Makhija |
| 6,047,222 A | 4/2000 | Burns et al. .................. 700/79 |
| 6,052,655 A | 4/2000 | Kobayashi et al. .......... 702/184 |
| 6,091,968 A | 7/2000 | Koohgoli et al. ............ 455/557 |
| 6,094,600 A | 7/2000 | Sharpe, Jr. et al. ............ 700/19 |
| 6,098,095 A | 8/2000 | Nelson et al. |
| 6,111,738 A | 8/2000 | McGoogan ................ 361/91.5 |
| 6,119,047 A | 9/2000 | Eryurek et al. ................ 700/28 |
| 6,179,964 B1 | 1/2001 | Begemann et al. ........ 162/198 |
| 6,192,281 B1 | 2/2001 | Brown et al. .................... 700/2 |
| 6,195,591 B1 | 2/2001 | Nixon et al. |
| 6,199,018 B1 | 3/2001 | Quist et al. ................... 702/34 |
| 6,211,623 B1 | 4/2001 | Wilhelm et al. ............. 315/224 |
| 6,236,334 B1 | 5/2001 | Tapperson et al. ..... 340/825.37 |
| 6,263,487 B1 | 7/2001 | Stripf et al. .................... 717/1 |
| 6,270,920 B1 | 8/2001 | Nakanishi et al. ........... 429/163 |
| 6,294,287 B1 | 9/2001 | Lee et al. |
| 6,298,377 B1 | 10/2001 | Hartkainen et al. ......... 709/223 |
| 6,304,934 B1 | 10/2001 | Pimenta et al. |
| 6,307,483 B1 | 10/2001 | Westfield et al. ....... 340/870.11 |
| 6,309,986 B1 | 10/2001 | Flashinski et al. |
| 6,312,364 B1 | 11/2001 | Selsam |
| 6,317,701 B1 | 11/2001 | Pyotsia et al. |
| 6,324,607 B1 | 11/2001 | Korowitz et al. ............. 710/102 |
| 6,356,191 B1 | 3/2002 | Kirkpatrick et al. ......... 340/501 |
| 6,370,448 B1 | 4/2002 | Eryurek ...................... 700/282 |
| 6,377,859 B1 | 4/2002 | Brown et al. .................. 700/79 |
| 6,397,114 B1 | 5/2002 | Eryurek et al. ................ 700/51 |
| 6,434,504 B1 | 8/2002 | Eryurek et al. .............. 702/130 |
| 6,444,350 B1 | 9/2002 | Toya et al. ..................... 429/90 |
| 6,449,574 B1 | 9/2002 | Eryurek et al. ................ 702/99 |
| 6,473,710 B1 | 10/2002 | Eryurek ...................... 702/133 |
| 6,487,462 B1 | 11/2002 | Reeves |
| 6,505,517 B1 | 1/2003 | Eryurek et al. ........... 73/861.08 |
| 6,519,546 B1 | 2/2003 | Eryurek et al. .............. 702/130 |
| 6,532,392 B1 | 3/2003 | Eryurek et al. ................ 700/54 |
| 6,539,267 B1 | 3/2003 | Eryurek et al. ................ 700/51 |
| 6,539,384 B1* | 3/2003 | Zellner et al. ................. 707/10 |
| 6,594,603 B1 | 7/2003 | Eryurek et al. .............. 702/104 |
| 6,594,621 B1 | 7/2003 | Meeker |
| 6,598,828 B2 | 7/2003 | Fiebick et al. |
| 6,601,005 B1 | 7/2003 | Kavaklioglu et al. ........ 702/104 |
| 6,611,775 B1 | 8/2003 | Coursolle et al. ............. 702/65 |
| 6,615,149 B1 | 9/2003 | Wehrs ......................... 702/76 |
| 6,629,059 B2 | 9/2003 | Borgeson et al. ............ 702/183 |
| 6,654,697 B1 | 11/2003 | Eryurek et al. ................ 702/47 |
| 6,656,145 B1 | 12/2003 | Morton ...................... 602/27 |
| 6,697,681 B1 | 2/2004 | Stoddard et al. |
| 6,714,969 B1 | 3/2004 | Klein et al. .................. 709/219 |
| 6,733,376 B2 | 5/2004 | Williams ................... 451/344 |
| 6,748,631 B2 | 6/2004 | Iguchi et al. |
| 6,775,271 B1 | 8/2004 | Johnson et al. |
| 6,795,798 B2 | 9/2004 | Eryurek et al. .............. 702/188 |
| 6,851,612 B2 | 2/2005 | Iasso et al. |
| 6,889,166 B2* | 5/2005 | Zielinski et al. ............. 702/183 |
| 2001/0053065 A1 | 12/2001 | Cudini et al. ................ 361/728 |
| 2002/0004370 A1 | 1/2002 | Stengele et al. |
| 2002/0065631 A1 | 5/2002 | Loechner .................... 702/188 |
| 2002/0077711 A1 | 6/2002 | Nixon et al. ................... 700/51 |
| 2002/0123864 A1 | 9/2002 | Eryurek et al. .............. 702/188 |
| 2002/0167904 A1 | 11/2002 | Borgeson et al. ............ 370/241 |
| 2002/0183863 A1 | 12/2002 | Eryurek ......................... 700/2 |
| 2003/0023408 A1 | 1/2003 | Wight et al. |
| 2003/0023795 A1 | 1/2003 | Packwood et al. .......... 710/105 |
| 2003/0033040 A1 | 2/2003 | Billings ....................... 700/97 |
| 2003/0058277 A1 | 3/2003 | Bowman-Amuah |
| 2003/0109937 A1 | 6/2003 | Zielinski et al. ................. 700/1 |
| 2003/0119568 A1* | 6/2003 | Menard ...................... 455/572 |
| 2003/0158795 A1 | 8/2003 | Markham et al. |
| 2003/0204373 A1* | 10/2003 | Zielinski et al. ............. 702/184 |
| 2004/0039458 A1 | 2/2004 | Mathiowetz et al. .......... 700/17 |
| 2004/0225796 A1* | 11/2004 | Hanson et al. ............... 710/301 |
| 2004/0230327 A1 | 11/2004 | Opheim et al. |
| 2004/0230899 A1 | 11/2004 | Pagnano et al. |
| 2004/0248619 A1 | 12/2004 | Graiger et al. ............... 455/566 |
| 2005/0114086 A1 | 5/2005 | Zielinski et al. .............. 702/184 |
| 2005/0289276 A1 | 12/2005 | Karschnia et al. ........... 710/305 |
| 2006/0094466 A1* | 5/2006 | Tran .......................... 455/558 |

FOREIGN PATENT DOCUMENTS

| | | |
|---|---|---|
| DE | 1993 0660 A1 | 1/2001 |
| EP | 0 633 420 A2 | 1/1995 |
| EP | 0 666 631 A2 | 1/1995 |
| EP | 0 676 818 B1 | 10/1995 |
| EP | 1 045 302 A1 | 4/2000 |
| EP | 1022626 A2 | 7/2000 |
| GB | 1 387 619 A | 3/1975 |
| GB | 2347232 | 8/2000 |
| JP | 2753592 | 1/1990 |
| JP | 2007-070224 | 3/2007 |
| WO | WO/96/12993 | 5/1996 |
| WO | WO/97/21157 | 6/1997 |
| WO | WO/98/14855 | 4/1998 |
| WO | WO/98/39718 | 9/1998 |
| WO | WO/00/41050 | 7/2000 |
| WO | WO/00/557000 | 4/2002 |

| WO | WO/02/027418 | 4/2002 |

OTHER PUBLICATIONS

U.S. Appl. No. 09/384,876, filed Aug. 27, 1999, Eryurek et al.
U.S. Appl. No. 09/409,098, filed Sep. 30, 1999, Eryurek et al.
U.S. Appl. No. 09/799,824, filed Mar. 5, 2001, Rome et al.
U.S. Appl. No. 09/852,102, filed May 9, 2001, Eryurek et al.
U.S. Appl. No. 09/855,179, filed May 14, 2001, Eryurek et al.
"Honeywell Introduces Pocket PC-based Toolkit for Configuring, Monitoring, Diagnosing, and Managing Smart Field Instruments," Oct. 21, 2002, Cyndi Bloom, Honeywell, 2 pages.
"Intrinsically Safe PDA," 1 page, Jan. 1, 2005; http://www.manufacturing.net/ctl/index.asp?layout=articlePrint&articleID=CA491829.
MCT202 Technical datasheet, Honeywell, 1 page.
HART Device Descriptions, Honeywell, 1 page.
"Fluke 179 Multimeter & ToolPak Combo Pack, "http://www.fluke.com/Multimeter/Toolpak .asp?AGID=6&SID=260 (2 pages), May 2003.
"Multifunction PDA Calibrator Transmation Model 3-PMF1," Transmation, Apr. 2001.
"AAPA 60 & 90 Series Multimeter," http://www.appatech.com/a-60new.htm (5 pages), May 2003.
"Fieldbus Standard for Use in Industrial Control Systems Part 2: Physical Layer Specification and Service Definition", ISA-S50.02-1992, pp. 1-93.
Hart Communications, Technical Information, Part 4 Communications, Samson, Frankfurt, May 2000.
Stawrt, "Rethink Instrument Specifications when Specifying Fieldbus Devices," Sep. 1999, control engineering, pp. 1-1.
Samson, "Technical Information," Jun. 1999, Samson AG, L452 & L454, Dec. 1999, pp. L452 (1-40) & L454 (1-42).
Diedrich et al., "Field Device Integration in DCS Engineering Using a Device Model," Aug. 31, 1998, pp. 164-168.
U.S. Appl. No. 10/790,627, filed Mar. 6, 2003, Mathiowetz.
U.S. Appl. No. 10/438,386, filed Mar. 1, 2004, Mathiowetz et al.
U.S. Appl. No. 10/440,047, May 16, 2003, Kantzes et al.
U.S. Appl. No. 10/426,894, filed Apr. 30, 2003, Duren et al.
U.S. Appl. No. 10/438,401, filed May 16, 2003, Opheim et al.
U.S. Appl. No. 10/440,434, filed May 16, 2003, DelaCruz et al.
U.S. Appl. No. 10/435,819, filed May 12, 2003, Kantzes et al.
U.S. Appl. No. 10/440,048, filed May 16, 2003, Duren et al.
U.S. Appl. No. 10/440,444, filed May 16, 2003, Mathiowetz et al.
U.S. Appl. No. 10/439,660, filed May 16, 2003, Mathiowetz et al.
U.S. Appl. No. 10/439,794, filed May 16, 2003, Mathiowetz.
U.S. Appl. No. 10/310,703, filed Dec. 5, 2002, Zielinski et al.
U.S. Appl. No. 10/440,041, filed May 16, 2003, Mathiowetz et al.
U.S. Appl. No. 10/440,441, filed May 16, 2003, Mathiowetz et al.
Examination Report from Application Number 04252805.9, filed May 14, 2002.
"Fieldbus Brings Protocol to Process Control," Santori et al., IEEE Spectrum, vol. 33, Issue 3, Mar. 1996, pp. 60-64.
"Computerized Maintenance systems-an Overview of Two Basic Types for Field Devices," Medlin, IEEE Pulp and Pater Industry Technical Conference, Jun. 21-25, 1999, pp. 230-232.
"Fieldbus in the Process Control Laboratory-its Time has Come," Rehg. et al., ASEE/IEEE Frontiers in Education Conference, vol. 3, Nov. 1999, pp. 13B4/12-13B4/17.
"Generic Device Description for Complex HART Field Device," Zulkifi et al., IEE 8th International Conference on Communication Systems, vol. 2, Nov. 25-28, 2002, pp. 646-650.
"SFC Smart Field Communicator-Model STS103," Honeywell, Specification, Dec. 1995, pp. 1-4.
"SFC Smart Field Communicator-Models SFC160/SFC260," Yamatake, Specification Apr. 1999, pp. 1-6.
"Hart Communicator," Fisher-Rosemount, Product Manual, Jul. 2000, pp. i-iv, ix-x, 1-1 -1-40 - 2-1 - 2-8 - 3-1 - 3-38 - A-1 - A-6 - B-1 - B-6 C-1 - C-4 - D-1 - D-4 and I-1 1-2.
Shoji et al., Fieldbus System Engineering, 1999, Yokogawa Technical Report.
Diedrich et al., Field Device Integration in DCS Engineering Using a Device Model, 1998, IEEE.
Dewey, Fieldbus Device Maintenance - Do I Need To Go To the Field Anymore?, The Instrumentation, Systems and Automation Society, ISA 2000.
Simon et al., Field Devices - Models and Their Realizations, Dec. 11-14, 2002, Industrial Technology, IEEE ICIT 2002, IEEE International Conference, vol. 1, pp. 307-312.
Communication from Application Number 05826038.4, filed Nov. 9, 2005.

* cited by examiner

DUAL PROTOCOL HANDHELD FIELD MAINTENANCE TOOL WITH RADIO-FREQUENCY COMMUNICATION

CROSS REFERENCE TO RELATED APPLICATIONS

The present application claims the benefit of U.S. provisional patent application Ser. No. 60/626,405, filed Nov. 9, 2004, entitled "WIRELESS (RADIO) INTRINSICALLY SAFE FIELD MAINTENANCE TOOL"; and the present application is a Continuation-In-Part application of U.S. patent application Ser. No. 11/007,876, filed Dec. 9, 2004 now U.S. Pat. No. 7,117,122, entitled FIELD MAINTENANCE TOOL, which application is a Divisional application of U.S. patent application Ser. No. 10/310,703, filed Dec. 5, 2002, now U.S. Pat. No. 6,889,166 entitled "INTRINSICALLY SAFE FIELD MAINTENANCE TOOL," which claims the benefit of U.S. provisional patent application Ser. No. 60/338,477, filed Dec. 6, 2001, entitled "INTRINSICALLY SAFE FIELD MAINTENANCE TOOL."

BACKGROUND

Handheld field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of a handheld field maintenance tool allows technicians to quickly diagnose such errors in the field.

Handheld field maintenance tools can be manufactured to comply with Intrinsic Safety requirements. Such requirements are intended to guarantee that instrument operation or failure cannot cause ignition if the instrument is properly installed in an environment that contains explosive gasses. This is accomplished by limiting the maximum energy stored in the transmitter in a worst case failure situation. Excessive energy discharge may lead to sparking or excessive heat which could ignite an explosive environment in which the tool may be operating.

Examples of intrinsic safety standards include European CENELEC standards EN50014 and 50020, Factory Mutual Standard FM3610, the Canadian Standard Association, the British Approval Service for Electrical Equipment in Flammable Atmospheres, the Japanese Industrial Standard, and the Standards Association of Australia.

One intrinsically safe field maintenance tool sold under the trade designation Model 275 HART® Communicator available from Fisher-Rosemount Systems, Inc., of Eden Prairie, Minn. HART® is a registered trademark of the HART® Communication Foundation. The Model 275 provides a host of important functions and capabilities and generally allows highly effective field maintenance. However, the Model 275 does not currently support communication with non-HART® (Highway Addressable Remote Transducer) devices.

The HART® protocol has a hybrid physical layer consisting of digital communication signals superimposed on the standard 4-20 mA analog signal. The data transmission rate is approximately 1.2 Kbits/SEC. HART® communication is one of the primary communication protocols in process industries.

Another major process industry communication protocol is known as the FOUNDATION™ fieldbus communication protocol. This protocol is based on an ISA standard (ISA-S50.01-1992, promulgated by the Instrument Society of America in 1992). A practical implementation was specified by the Fieldbus Foundation (FF). FOUNDATION™ Fieldbus is an all-digital communication protocol with a transmission rate of approximately 31.25 Kbits/SEC.

SUMMARY

A dual-protocol handheld field maintenance tool is provided with radio frequency communication. The radio frequency commination can be provided by virtue of an SDIO card inserted within an SDIO slot in the handheld field maintenance tool. A method of. interacting with a process using a dual-protocol handheld field maintenance tool is also provided.

DETAILED DESCRIPTION

An improved handheld field maintenance tool in accordance with embodiments of the present invention is operable with at least two industry standard device descriptions and is operably connectable to a radio-frequency communication module. In one specific embodiment, a handheld field maintenance tool implements both HART® and FOUNDATION™ Fieldbus wired communication and includes a radio-frequency communication module.

The improved handheld field maintenance tool facilitates convenient interaction with individual field devices and/or sensors as well as providing advanced diagnostic and/or configuration features. Further details and benefits of the improved handheld field maintenance tool in accordance with embodiments of the present invention will be appreciated after reading the description below.

Figure 1:
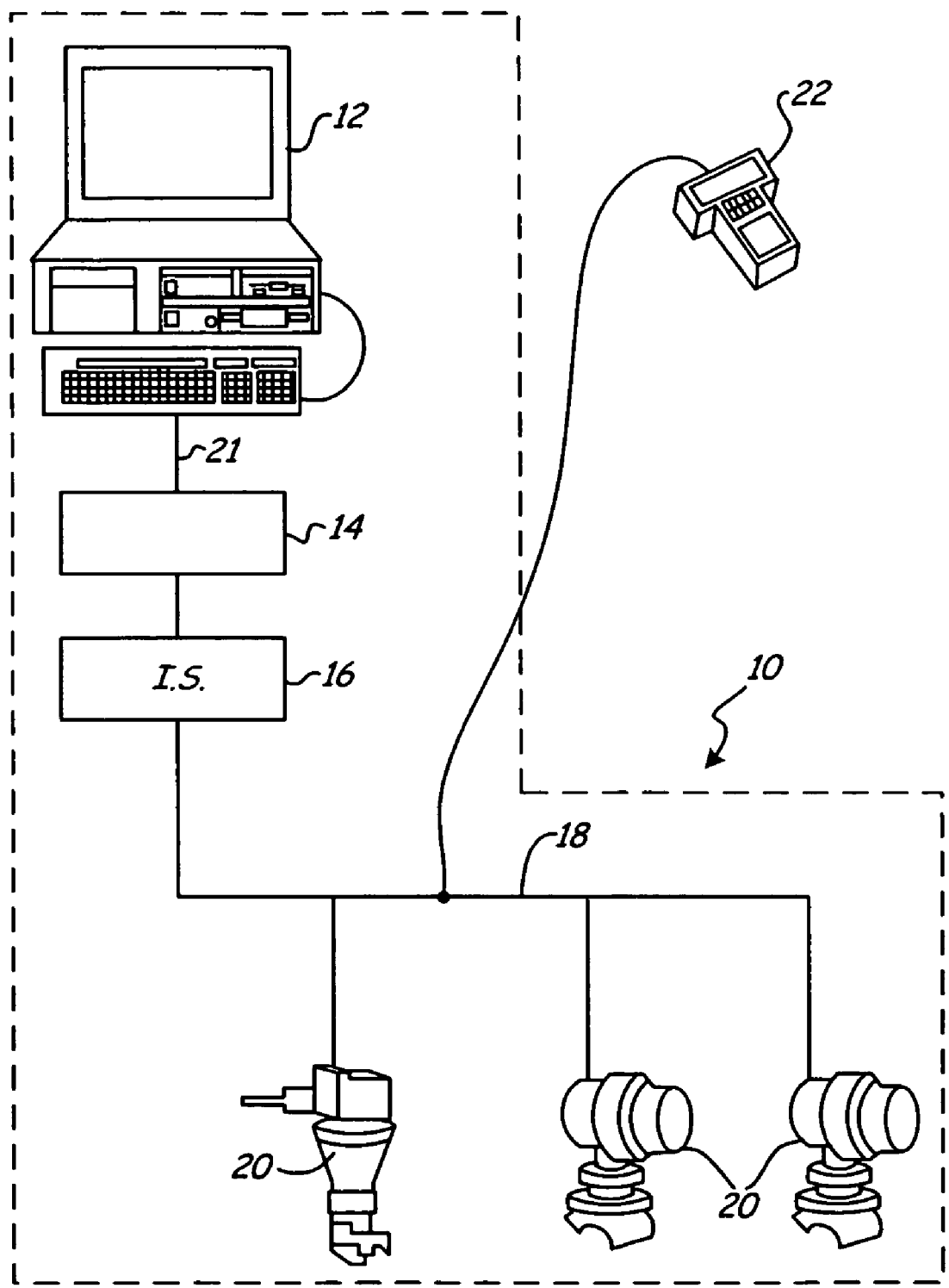
FIG. 1 illustrates a multidrop wiring configuration.

FIG. 1 illustrates an exemplary system in which embodiments of the present invention are particularly useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

Handheld field maintenance tool 22 is coupled to loop 18 as illustrated in FIG. 1. When coupled to a process control loop as shown, tool 22 can perform a number of communication and diagnostic functions. Tool 22 can couple to and interact with HART® process communication loops in much the same way the presently available Model 275 HART® Communicator can.

Figure 2A:
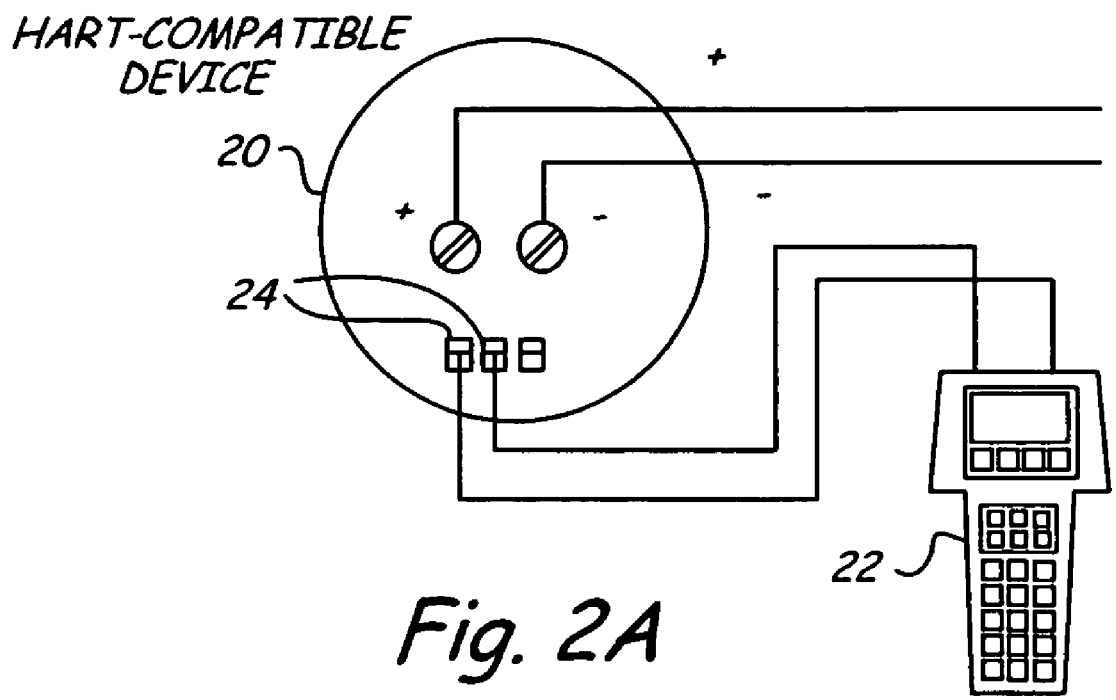
FIGS. 2A and 2B illustrate ways in which an intrinsically safe field maintenance tool may be connected to a field device.
Figure 2B:
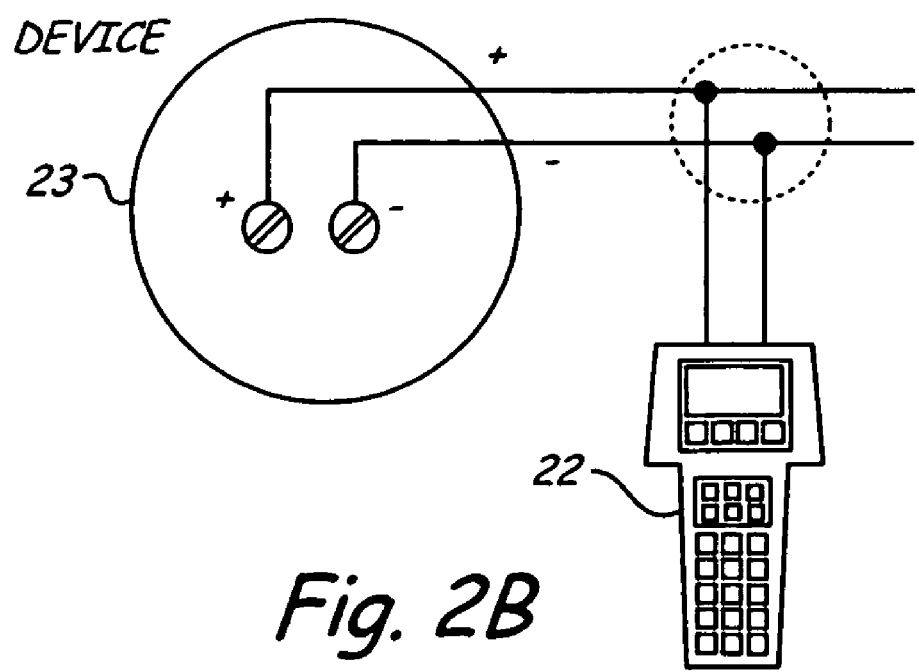

FIG. 2A illustrates tool 22 coupled to HART®-compatible device 20 via terminals 24. Alternately, tool 22 can communicate with a HART® compatible device on the process instrumentation communication loop, such as device 23 via the loop itself, as indicated in FIG. 2B.

Figure 3:
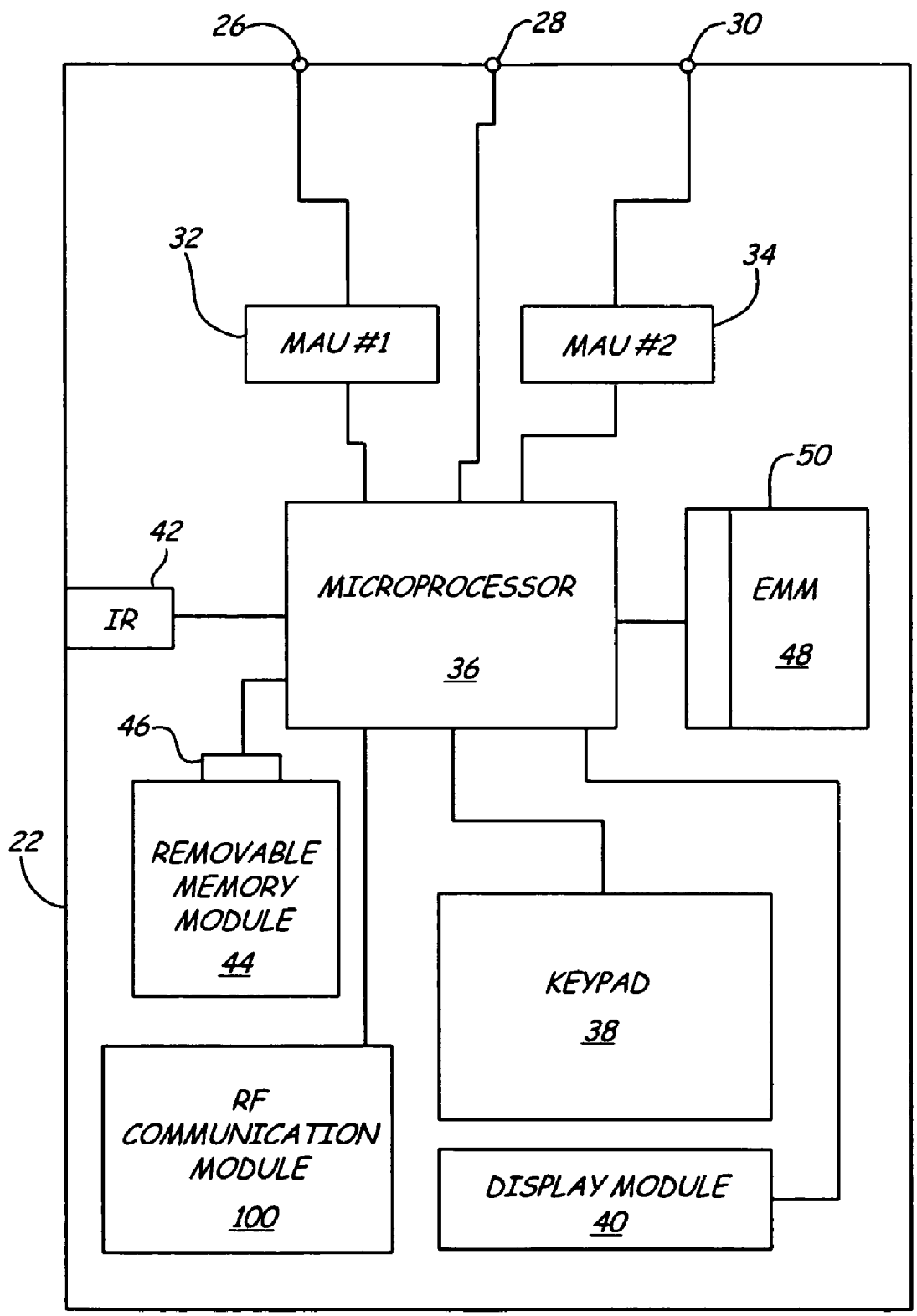
FIG. 3 is a diagrammatic view of field maintenance tool in accordance with an embodiment of the present invention.

FIG. 3 is a diagrammatic view of handheld field maintenance tool 22 in accordance with an embodiment of the present invention. Tool 22 includes three communication terminals 26, 28 and 30 which facilitate coupling tool 22 to process communication loops and/or devices in accordance with at least two process industry standard protocols. For example, when tool 22 is to be coupled to a loop of a first process industry standard protocol, such coupling is effected using terminal 26 and common terminal 28. Accordingly, the connection then is made via media access unit 32 which is configured to interact upon the process communication loop in accordance with the first industry standard protocol. Additionally, when tool 22 is to be coupled to a process communication and control loop that operates in accordance with a second industry standard protocol, such connection is made via common terminal 28 and terminal 30. Thus, such a connection is effected via the second media access unit 34 which is configured to interact upon the process communication loop in accordance with the second industry standard protocol. Both media access units 32 and 34 are coupled to processor 36 which receives data from one of the media access units and interprets that data accordingly.

Processor 36 is also coupled to keypad module 38 and display module 40. Keypad module 38 is coupled to the keypad on the housing of tool 22 in order to receive various keypad inputs from a user. Display module 40 is coupled to the display to provide data and/or a user interface.

Tool 22 may include infrared data access port 42 which is coupled to processor 36 to allow tool 22 to transfer information to and from a separate device using infrared wireless communication. One advantageous use of port 42 is for transferring and/or updating Device Descriptions stored in one or more memories of tool 22. A Device Description (DD) is a software technology used to describe parameters in a field device in a computer-readable format. This contains all of the information necessary for a software application being executed on processor 36 to retrieve and use the parametric data. The separate device such as computer 12, can obtain a new Device Description from floppy disk, CD ROM, or the internet and wirelessly transfer the new Device Description to tool 22.

Tool 22 may include expansion memory module 48 coupled to processor 36 via connector 50 which can be disposed on the main board of tool 22. Expansion memory module 48 may contain Device Descriptions of first and second industry standard protocols. Module 48 may also contain license code(s) that will determine the functionality of tool 22 with respect to the multiple protocols. For example, data residing within module 48 may indicate that tool 22 is only authorized to operate within a single process industry standard mode, such as the HART® protocol. Ultimately, a different setting of that data within module 48 may indicate that tool 22 is authorized to operate in accordance with two or more industry standard protocols. Module 48 is preferably inserted to a connector 50 on the main board and may in fact require partial disassembly of tool 22, such as removing the battery pack to access port 50.

Tool 22 may include removable memory module 44 which is removably coupled to processor 36 via port/interface 46. Removable memory module 44 is adapted to store software applications that can be executed instead of primary applications on processor 36. For example, module 44 may contain applications that use the HART® or FOUNDATION™ fieldbus communication port, to provide a comprehensive diagnostic for a given field device.

Module 44 may store software applications that aid in the calibration or configuration of specific devices. Module 44 may also store a software image for a new or updated primary device application that can subsequently be transferred into the non-volatile memory of device 22 to enable execution of the updated application. Further still, module 44 provides removable memory storage for the configuration of multiple devices allowing a field maintenance operator to acquire a relatively substantial amount of device data and conveniently store or transfer such data by simply removing module 44.

Preferably, the software installable via removable memory module 44 is separately licensable by allowing a field maintenance technician to purchase a license key with the software that is based upon the serial number of removable memory module 44. Preferably, tool 22 is configured, via hardware, software, or both, to detect when removable memory module 44 is coupled thereto and to automatically recognize the existence of additional software functionality within removable memory module 44. Once such additional functionality is recognized, the software or other data within module 44 is copied/installed to the random access memory (RAM) of tool 22. Thereafter, removable memory module 44 can be removed from tool 22 while the benefits of the added software functionality will persist. One form of removable memory module 44 includes commercially available flash memory, or a combination of storage and input/output capability. Essentially, removable memory module 44 includes any suitable storage media which can maintain data therein, and for which the physical package is amendable to the constraints listed below. By using removable memory module 44, multiple software applications and/or sets of data can be loaded into tool 22 without taking up additional space on the internal flash memory of tool 22.

Preferably, module 44 is adapted to be replaceable in hazardous areas in a process plant. Thus, it is preferred that module 44 comply with intrinsic safety requirements set forth in: APPROVAL STANDARD INTRINSICALLY SAFE APPARATUS AND ASSOCIATED APPARATUS FOR USE IN CLASS I, II AND III, DIVISION 1HAZARDOUS (CLASSIFIED) LOCATIONS, CLASS NUMBER 3610, promulgated by Factory Mutual Research October, 1988. Adaptations to comply with additional industrial standards such as Canadian Standards Association (CSA) and the European CENELEC standards are also contemplated. Examples of specific structural adaptations for memory module 44 and/or interface 46 to facilitate compliance include energy limiting circuits such that the operating voltage level of memory module 44 is sufficiently low that stored energy within module 44 cannot generate a source of ignition.

Module 44 may include current limiting circuitry to ensure that in the event that specific terminals on module 44 are shorted, that the discharge energy is sufficiently low that ignition is inhibited. Finally, interface 46 may include physical characteristics that are specifically designed to prevent exposure of electrical contacts on memory module 44 to an external environment while simultaneously allowing suitable interface contacts to make electrical contact with module 44. For example, module 44 may include an overmolding that can be pierced or otherwise displaced by coupling module 44 to interface 46. Interface 46 can be constructed to accept and operate with cards manufactured in accordance with the known Secure Digital Input/Output (SDIO) specification: Secure Digital Input/Output Card Specification Version 1.00, October 2001, maintained by the SD Association. Further information can be obtained by visiting www.sandisk.com. Preferably, interface 46 is an intrinsically safe SDIO card slot.

Handheld field maintenance tool 22 includes, is coupled to, or is coupleable to an RF communication module. In the embodiment illustrated in FIG. 3, handheld field maintenance tool 22 includes RF communication module 100 coupled to microprocessor 36. Wireless communications module 100 receives data from microprocessor 36 and generates appropriate wireless communication signals based thereon. Additionally, wireless communications module 100 can receive wireless communications and provide data relative to the wireless communications to microprocessor 36. Examples of wireless communication module 100 include any technology now known or later developed that is able to provide or transmit information via radio frequency signals. Wireless communication module 100 can communicate process-related information as well as device-related information.

Depending on the application, wireless communication module 100 may be adapted to communicate in accordance with any suitable wireless communication protocol including, but not limited to: wireless networking technologies (such as IEEE 802.11(b) wireless access points and wireless networking devices built by Linksys of Irvine, Calif.) cellular or digital networking technologies (such as Microburst® by Aeris Communications Inc. of San Jose, Calif.), ultra wideband, global system for mobile communications (GSM), general packet radio services (GPRS), code division multiple access (CDMA), spread spectrum technology, short messaging service/text messaging (SMS), or any other suitable radio frequency wireless technology. Further, known data collision technology can be employed such that multiple handheld field maintenance tools employing radio frequency communication module 100 can coexist and operate within wireless operating range of one another. Such collision prevention can include a number of different radio-frequency channels and/or spread spectrum techniques. Additionally, RF communication module 100 can be a commercially available bluetooth communication module. In the embodiment illustrated in FIG. 3, RF communication module 100 is a component within handheld field maintenance tool 22 that is coupled to an antenna (not shown) that may be an internal or external antenna.

Figure 4:
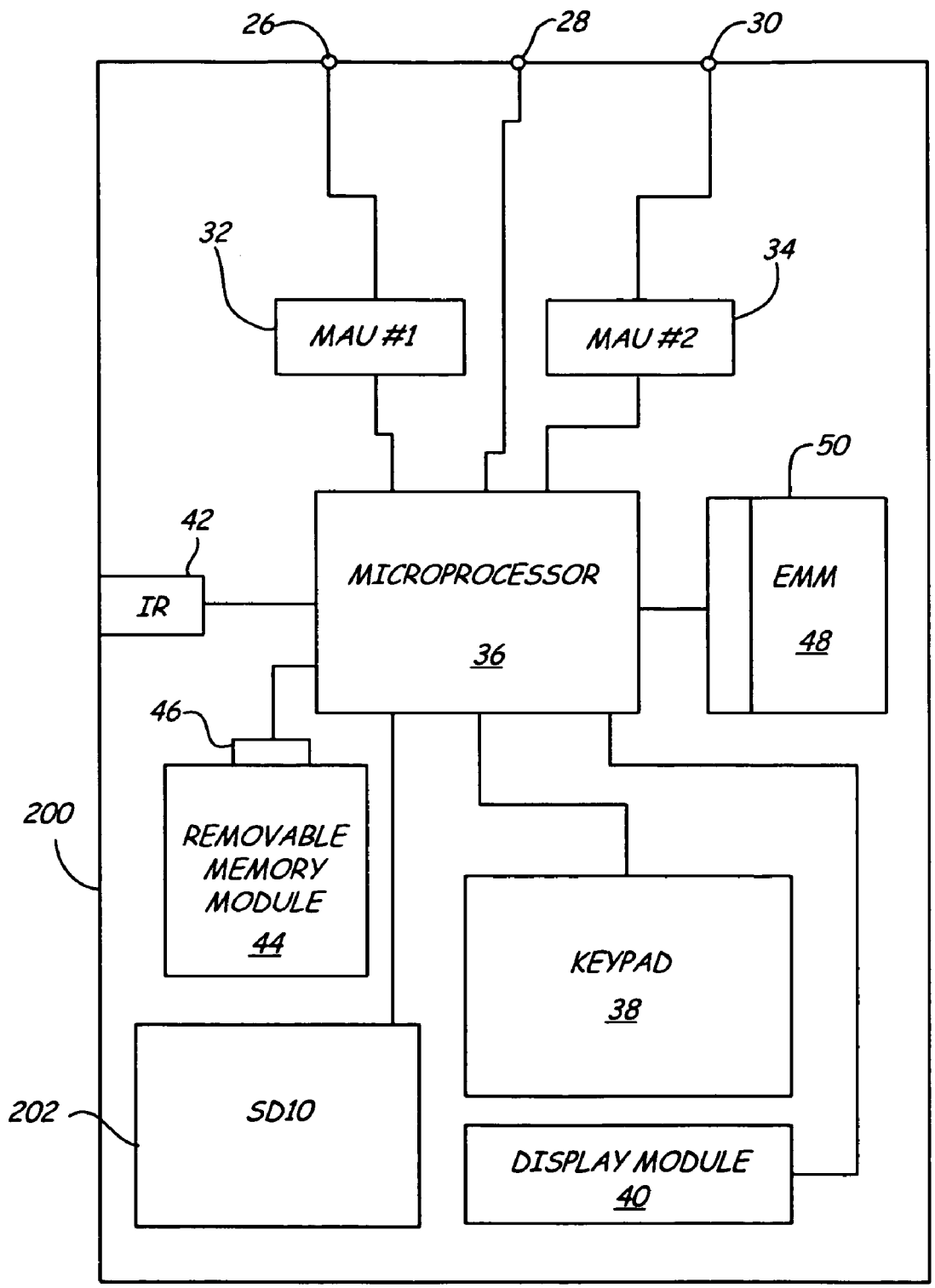
FIG. 4 is a diagrammatic view of field maintenance tool in accordance with another embodiment of the present invention.

FIG. 4 is a diagrammatic view of a handheld field maintenance tool in accordance with another embodiment of the present invention. Handheld field maintenance tool 200 bears many similarities to handheld field maintenance tool 22 and like components are numbered similarly. Handheld field maintenance tool 200 includes a standardized interface port 202. Standardized interface port 202 is preferably constructed for compliance with intrinsic safety requirements, as set forth above. More preferably, standardized interface 202 is constructed to accept cards manufactured in accordance with the SDIO specification. There are a number of such cards currently available on the market. Examples of such SD cards include cards that communicate in accordance with IEEE 802.11(b), and Bluetooth® a standard maintained by Bluetooth SIG, Inc., a Delaware corporation. Additionally, it is contemplated that as the state of wireless communication advances, improved SDIO radio frequency cards may become available with extended range and/or bandwidth. Accordingly, the provision of an SDIO slot in handheld field maintenance tool 200 not only allows tool 200 to be used with wireless SD cards commercially available, but also allows tool 200 to be used with newer more advanced models that may become available in the future. Further, the SDIO physical specification provides, or can be adapted to provide, intrinsically safe couplings to SD cards.

Figure 5:
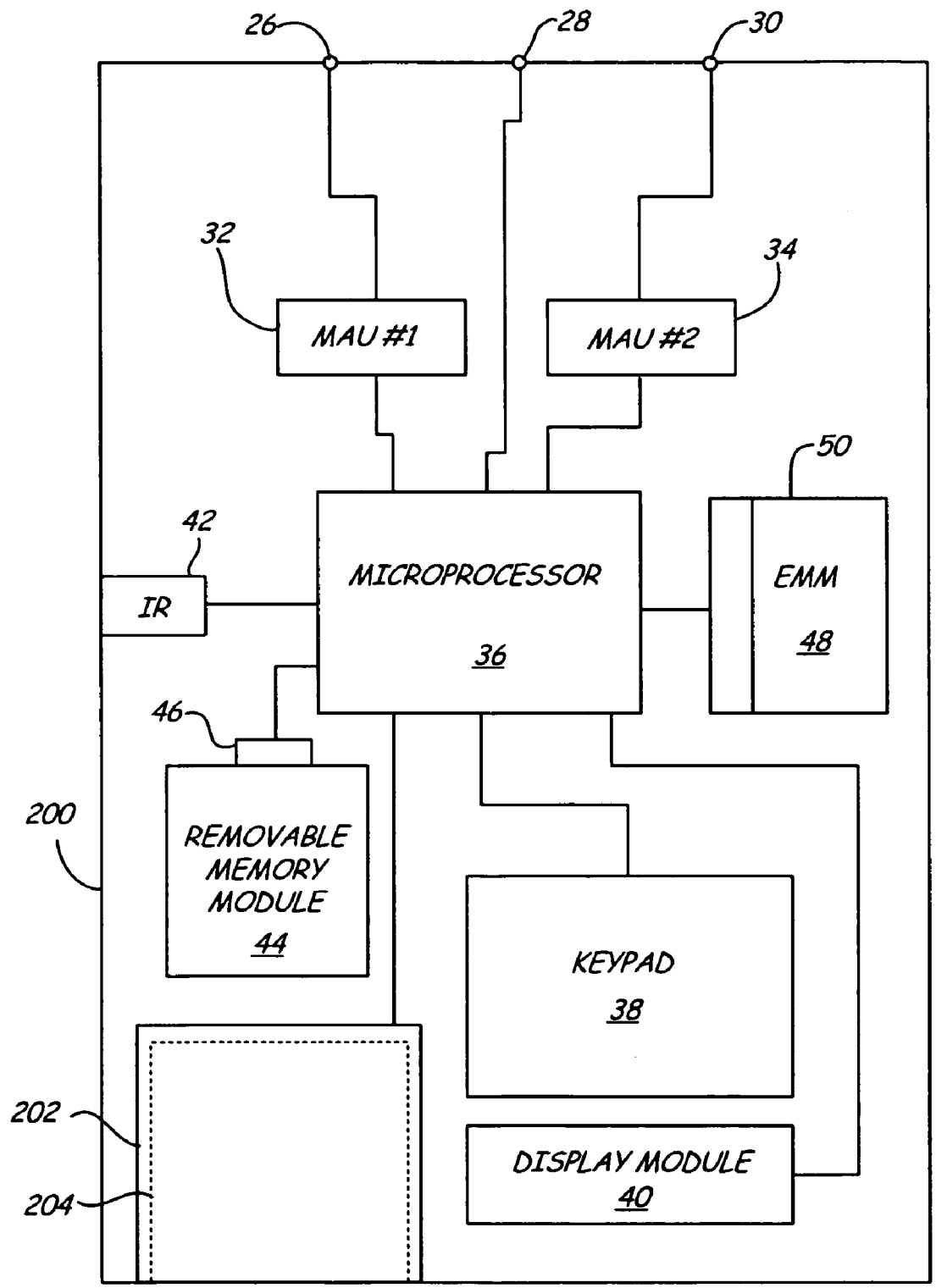
FIG. 5 is a diagrammatic view of field maintenance tool in accordance with another embodiment of the present invention.

FIG. 5 is a diagrammatic view of handheld field maintenance tool 200 having radio frequency SD card 204 disposed in its SDIO slot 202. While FIGS. 4 and 5 illustrate the SDIO connection at the bottom of the figure, it is expressly contemplated that the actual location of the SDIO slot on the handheld field maintenance tool can be in any appropriate position including the top, sides, or bottom.

Figure 6:
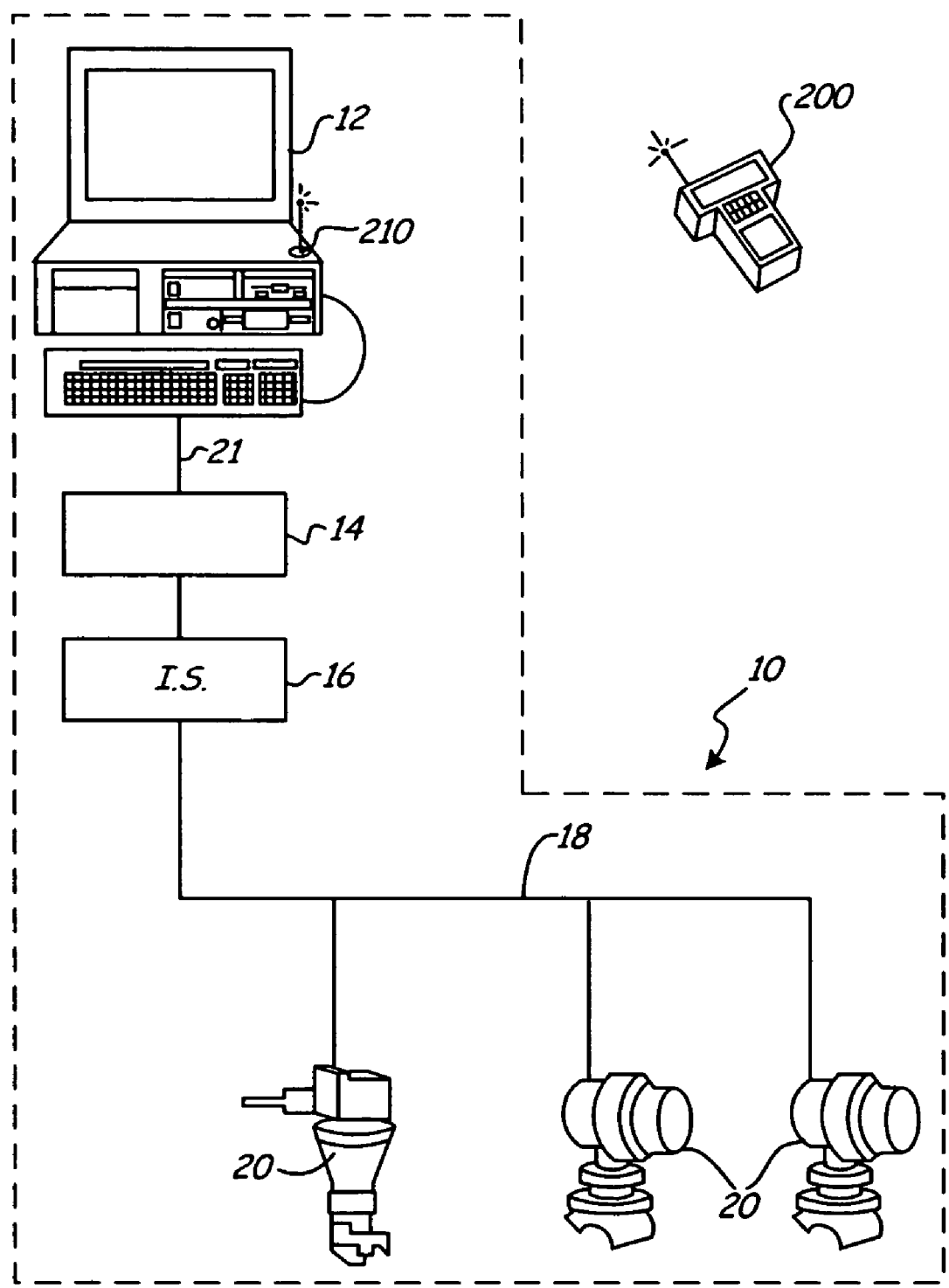
FIG. 6 is a diagrammatic view of a handheld field maintenance tool interacting with a process communication and control system in accordance with an embodiment of the present invention.

FIG. 6 is a diagrammatic view of handheld field maintenance tool 200 interacting with system 10 in accordance with an embodiment of the present invention. In particular, dual protocol handheld field maintenance tool 200 can communicate wirelessly with controller 12 if controller 12 is provided with commercially available wireless communication technologies, indicated diagrammatically at reference numeral 210. This wireless communication can take many forms including messaging and/or requests for authorization. In particular, a maintenance technician or process engineer using handheld field maintenance tool 200 can be in the field and, as long as the maintenance technician or process engineer is located within wireless range of controller 12, initiate a key sequence on the handheld field maintenance tool that notifies the operator at controller 12 of the intended activity of the maintenance technician or process engineer. Then, with the permission and/or assistance of the operator of controller 12, the maintenance technician or process engineer can perform certain operations, such as configuration, on a field device without actually physically connecting to it. Moreover, the use of the wireless communication protocol to send a signal or signals to a controller to cause some desired action within the wire process communication network can allow the maintenance technician to observe the response or responses of various field devices without actually coupling to the field device or process control network itself.

Figure 7:
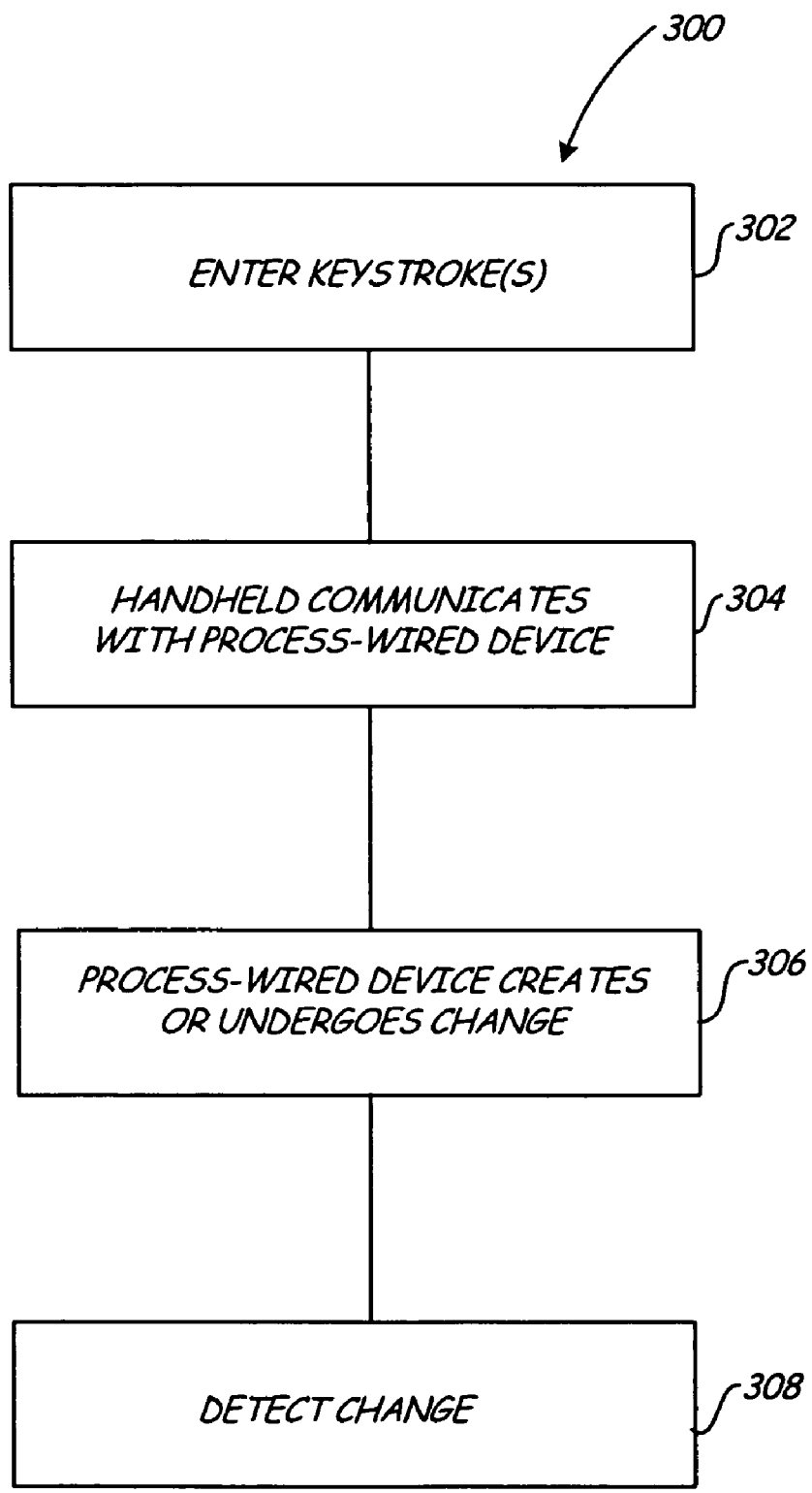
FIG. 7 is a block diagram of a method of interacting with a process communication and control network using a dual-protocol handheld field maintenance tool in accordance with an embodiment of the present invention.

FIG. 7 is a block diagram of a method of interacting with a process communication and control network using a dual-protocol handheld field maintenance tool in accordance with an embodiment of the present invention. Method 300 begins at block 302 where a technician or process engineer enters one or more keystrokes into a handheld field maintenance tool, such as handheld field maintenance tool 200. Then, at block 304, the handheld field maintenance tool issues wireless communication to at least one process-wired device. Examples of a process-wired device include controller 12, control sub-system 14, and/or field devices 20, as long as any of such devices 12, 14 and/or 20 include the capability for wireless communication. In response to reception of the wireless communication from the dual-protocol handheld field maintenance tool, the process-wired device creates or undergoes a change, as indicated at block 306. Examples of the process-wired device creating change include the process-wired device issuing one or more commands upon the process communication and control loop to cause another device coupled to the loop to change state, such as the setting of one or more configuration or calibration parameters. An example of the process-wired field device undergoing change includes the process-wired field device changing the state of itself, whether that state be a variable or variables contained therein, or the change of a physical state, such as setting an alarm, indicator, or moving an actuator, such as a valve. At block 308, the change is detected. Preferably this detection is done by a technician, either by visually inspecting a change relative to a field device, or by coupling the terminals of the dual-protocol handheld field maintenance tool to the process communication loop or to an affected field device.

Method 300 allows a maintenance technician to, using wireless radio-frequency communication, effect one or more changes to or upon the field devices coupled to the process loop. These changes can then be observed by the maintenance technician or process engineer in order to facilitate process communication loop diagnostics, field device diagnostics, field device configuration, and/or field device calibration.

Figure 8:
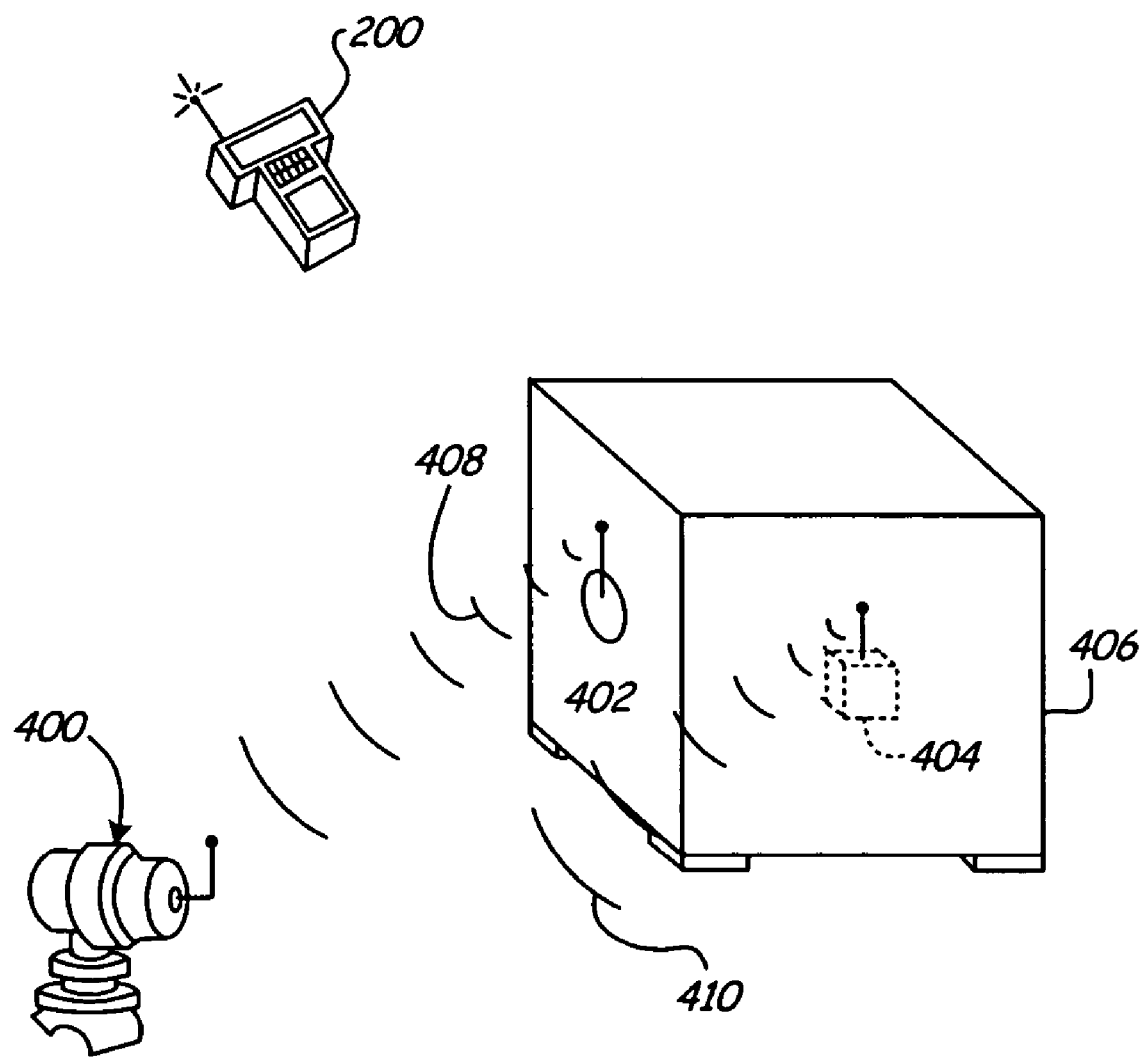
FIG. 8 is a diagrammatic view of a handheld field maintenance tool interacting with process sensors in accordance with an embodiment of the present invention.

FIG. 8 is a diagrammatic view of another situation in which a dual-protocol handheld field maintenance tool having wireless radio frequency communication is particularly useful. In some process installations, the sensors themselves transmit raw wireless data to a intermediate device, such as a process variable transmitter, which then calculates a process variable from the raw sensor data and transmits process information based on such data. FIG. 8 illustrates process variable transmitter 400 interacting with wireless sensors 402 and 404 coupled to machinery 406 illustrated as a box. Sensor 402, for illustration purposes, is a vibration sensor coupled to machinery 406 transmitting raw sensor data 408 indicative of vibration of machine 406. Sensor 402 includes a wireless transceiver and internal power source (not shown) as well as a sensor, such as a piezoelectric sensor, that generates a signal in response to a vibration. Sensor 404 is disposed within machinery 406 and also includes an internal power source and wireless transceiver. Sensor 404 is, for illustration purposes, a temperature sensor that senses a temperature within machine 406 and generates or otherwise transmits raw sensor wireless information 410 indicative of the internal temperature within machine 406. Raw wireless information 408 and 410 is transmitted to transmitter 400 that receives the information and calculates, using internal processing circuitry, such as a microprocessor, a process variable or other variable based on the wireless raw sensor information. The information calculated or otherwise discerned by transmitter 400 may be transmitted along a wired process control loop (not shown) or transmitted wirelessly by transmitter 400. In some situations, it may be useful to wirelessly interact directly with the wireless sensors. In such applications, handheld field maintenance tool 200 can be used to employ its wireless communication to interact directly with one or more wireless sensors. As defined herein, a wireless sensor is any device that senses information indicative of the sensor's primary variable of interest. As can be seen in FIG. 8, the sensors 402 and 404 are directly interfaced to the process (machine 406) making measurements of one or more physical parameters. Handheld field maintenance tool 200 can be used to set up, validate and troubleshoot each or both of the sensors 402 and 404 without making any physical connections thereto. Without the wireless communication ability of handheld field maintenance tool 200, tool 200 would not be able to directly communicate with the sensor. Instead, communications would only be available through field device 400. Thus, if any error or problem existed within device 400, communication to sensors 402 and 404 could be compromised.

Although the present invention has been described with reference to preferred embodiments, workers skilled in the art will recognize that changes may be made in form and detail without departing from the spirit and scope of the invention.

What is claimed is:

1. A dual-protocol handheld field maintenance tool comprising:
   terminals selectively coupling to a process communication loop having a communication protocol;
   first and second media access units coupled to the terminals, wherein the first media access unit is adapted to communicate in accordance with a first communication protocol, and wherein the second media access unit is adapted to communicate in accordance with a second protocol that is different than the first protocol;
   a processor coupled to the first and second media access units;
   a wireless transceiver coupled to the processor; and
   wherein at least one of the first and second communication protocols requires superimposing digital signals on a 4-20 mA analog signal.

2. The dual-protocol handheld field maintenance tool of claim 1, wherein the tool is intrinsically safe.

3. The dual-protocol handheld field maintenance tool of claim 1, wherein the wireless transceiver is configured to communicate at a frequency of approximately 2.4 gigahertz.

4. A dual-protocol handheld field maintenance tool comprising:
   terminals selectively coupling to a process communication loop having a communication protocol;
   first and second media access units coupled to the terminals, wherein the first media access unit is adapted to communicate in accordance with a first communication protocol, and wherein the second media access unit is adapted to communicate in accordance with a second protocol that is different than the first protocol;
   a processor coupled to the first and second media access units;
   an intrinsically safe SDIO card interface coupled to the processor; and
   wherein at least one of the first and second communication protocols requires superimposing digital signals on a 4-20 mA analog signal.

5. The handheld field maintenance tool of claim 4, and further comprising a radio-frequency communication module installed in the SDIO card interface of the tool.

6. The dual-protocol handheld field maintenance tool of claim 5, wherein the wireless radio-frequency communication module is configured to communicate at a frequency of approximately 2.4 gigahertz.

7. The dual-protocol handheld field maintenance tool of claim 4, wherein the tool is intrinsically safe.

\* \* \* \* \*

UNITED STATES PATENT AND TRADEMARK OFFICE
CERTIFICATE OF CORRECTION

PATENT NO. : 7,426,452 B2 Page 1 of 1
APPLICATION NO. : 11/269866
DATED : September 16, 2008
INVENTOR(S) : Zielinski et al.

It is certified that error appears in the above-identified patent and that said Letters Patent is hereby corrected as shown below:

On page 3, column 2, please delete "U.S. Appl. No. 10/439,794, filed May 16, 2003, Mathiowetz." and insert --U.S. Appl. No. 10/439,764, filed May 16, 2003, Mathiowetz.--

Signed and Sealed this

Tenth Day of February, 2009

JOHN DOLL
*Acting Director of the United States Patent and Trademark Office*